Aug. 12, 1969  B. KRALOWETZ  3,460,364
PROCESS AND APPARATUS FOR FORMING PERIPHERALLY
CONTINUOUS ENLARGED PORTIONS ON A SHELL
OF A CYLINDRICAL HOLLOW BODY
Filed Dec. 5, 1967  2 Sheets-Sheet 1
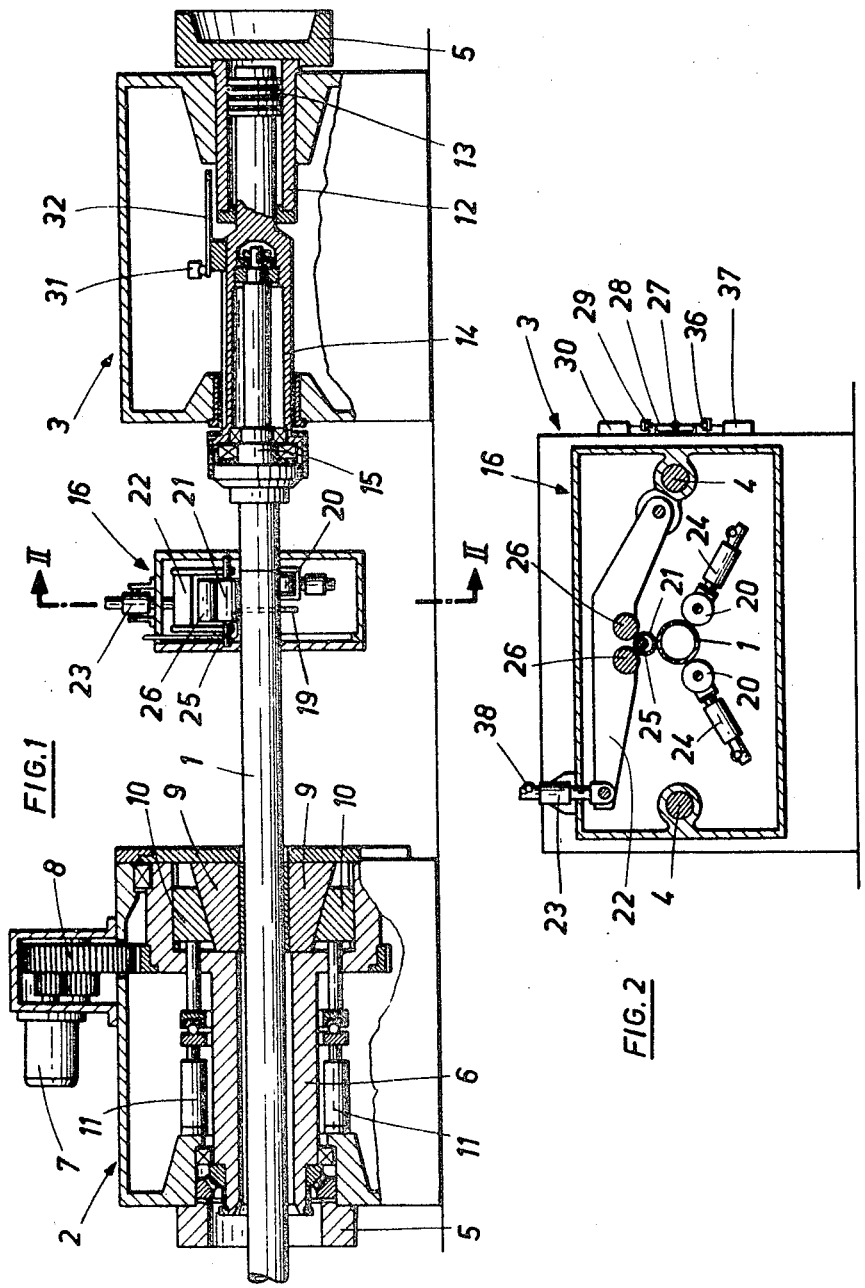
INVENTOR.
BRUNO KRALOWETZ
BY Kurt Kelman
AGENT

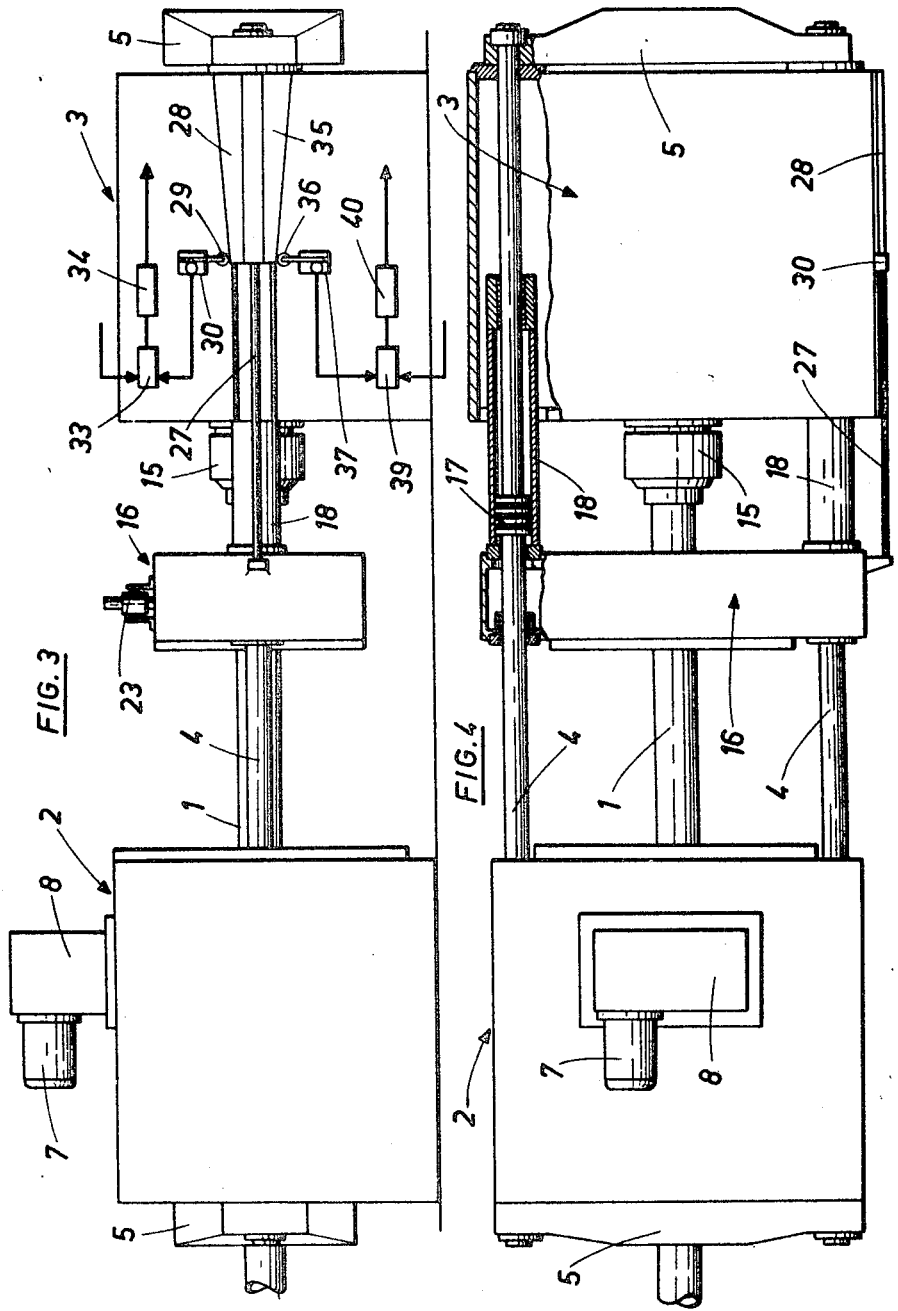

United States Patent Office 3,460,364
Patented Aug. 12, 1969

3,460,364
PROCESS AND APPARATUS FOR FORMING PE-
RIPHERALLY CONTINUOUS ENLARGED POR-
TIONS ON A SHELL OF A CYLINDRICAL
HOLLOW BODY
Bruno Kralowetz, Weinleiten 142,
Steyr-St. Ulrich, Austria
Filed Dec. 5, 1967, Ser. No. 688,253
Claims priority, application Austria, Jan. 26, 1967,
A 745/67
Int. Cl. B30b 15/26; B21d 37/16; B21b 37/14
U.S. Cl. 72—7
6 Claims

ABSTRACT OF THE DISCLOSURE

A hollow body is gripped in its axial direction between a stationary gripping station and an upsetting punch and is partly surrounded with an annular heating inductor. Simultaneously, the gripped hollow body is rotated about its axis, a constant upsetting pressure is applied through said punch to said rotating, gripped, hollow body, constant electric power is supplied to said heating inductor and the same is moved at constant speed in said axial direction. The hollow body is thus subjected to a local temperature rise in an axially advancing zone. The displacement of said upsetting punch is controlled in dependence on the position of said inductor so as to obtain the desired shell profile.

---

Cylindrical hollow bodies, particularly tubes, are sometimes provided on their shell with peripherally continuous, enlarged portions, which may serve various purposes, e.g., to reinforce the tube or to provide for an adequate wall thickness for a subsequent machining or non-cutting shaping. It is known for this purpose to grip the tube between a stationary gripping station and an upsetting punch and to apply an axial upsetting pressure to the tube while the same is rotated about its axis and is subjected to local heating in an advancing zone by means of an annular heating inductor, which partly surrounds the tube and is displaceable in the axial direction of the tube and, if desired, to the action of at least one pressure roll, which is displaceable with the annular heating inductor and radially engageable with the hollow body. As the annular heating inductor heats an annular portion of the hollow body at a given time, and the hollow body is being rotated and subjected to the axial upsetting pressure at the same time, the shell is formed with the desired enlarged portion, which may extend over part of the length or over the entire length of the hollow body, depending on the feed of the annular heating inductor. When it is desired to obtain different shell wall thicknesses and different shell profiles, the previous practice is to feed the annular heating inductor at constant speed and to maintain a constant upsetting pressure while the heat output of the annular heating inductor is controlled or regulated by means of a template or the like, so that the extent of upsetting depends on the local temperature rise. This control has various disadvantages. For instance, the full inductor power is selected for the largest extent of upsetting which may be required and is only partly utilized with most shaping operations. Above all, the desired shell profile cannot be exactly obtained because the extent of upsetting will depend not only on the temperature rise but also on the resistance to upsetting. This resistance depends on temperature, speed, the different restrictions to flow during external and internal upsetting, friction, etc.

It is an object of the invention to provide a process of forming peripherally continuous, enlarged portions on the shells of hollow cylindrical bodies, in which process the above-mentioned disadvantages do not arise and the desired shell profile can be obtained with high accuracy.

Based on a process, in which the hollow body rotating about its axis is subjected to an axial upsetting pressure between a fixed gripping station and an upsetting punch and is subjected to local heating in an advancing zone by means of an annular heating inductor, which partly surrounds the hollow body and is displaced in the axial direction at constant speed, and if desired, to the simultaneous action of a co-displaceable pressure roll, which is radially engageable with the hollow body, the process according to the invention resides essentially in that the inductor power and, in known manner, the upsetting pressure are held constant throughout the shaping operation and the displacement of the upsetting punch is controlled in dependence on the displacement of the annular heating inductor so as to obtain the desired shell profile. As only the displacement of the upsetting punch is controlled, the desired quantity of material is upset at each point of the portion to be deformed so as to obtain the desired shell profile and this is independent of the changes in resistance to upsetting, provided that a sufficiently high upsetting pressure is initially selected so that there is an adequate surplus of upsetting force. If the movement of the upsetting punch relative to the annular heating inductor corresponds to the desired quantity of material which is to be upset, the desired shell profile will necessarily be obtained with high accuracy. The speed of the annular heating inductor can readily be adjusted to such a value that the inductor power which is available will almost be optimally utilized. If neither a pressure roll nor an internal mandrel were used, the upsetting would result in an inward displacement of about one third of the material and in an outward displacement of about two thirds of the material, and the desired outside and inside diameters of the hollow body could not be exactly obtained. In order to provide for the desired accuracy also in this respect, the pressure roll is used for internal upsetting work, where the material is only inwardly displaced. In this case, the pressure roll maintains a constant outside diameter and forces the material inwardly. For an upsetting only on the outside, the mandrel maintains a constant inside diameter and the pressure roll is rendered inoperative. For an upsetting partly in an outward direction and partly in an inward direction, the pressure roll forces the material inwardly and is controlled in dependence on the displacement of the annular heating inductor so that the desired outside profile is obtained.

In a development of the invention, the upsetting punch is extended in the same direction as the annular heating inductor so that the pressure which is due to the displacement of the heating inductor and the upsetting pressure have the same direction and the material which has been preheated and partly upset in forced in a desirable manner into the heating zone during the upsetting operation. It is also desirable to cool the hollow body slightly behind the heating inductor, considered in the feeding direction of the latter, so that a further deformation of the previously upset profile during the subsequent shaping operation will be reliably prevented.

The process according to the invention is carried out by an apparatus which comprises in known manner two gripping heads for the hollow body, one of which gripping heads holds the hollow body against axial displacement while permitting of a rotation thereof, whereas the other gripping head is provided with an upsetting punch acting on the end face of the hollow body, and a unit which is displaceable between the two gripping heads and comprises an annular heating inductor, which partly surrounds the hollow body, and preferably an upper pressure roll and two lower backing rolls, which pressure roll and backing rolls are radially engageable with the hollow body. According to the invention, the apparatus is characterized in that two pick-ups are provided, the first of which is operable by the feeler, which cooperates with a template, which moves relative to the feeler in dependence on the displacement of the unit, whereas the second pick-up is adjustable in dependence on the displacement of the upsetting punch, and both pick-ups are differentially coupled to a common controller, which controls the application of pressure to the upsetting punch in dependence on the difference between the sensed values. The application of pressure to displace the upsetting punch is thus continued until the desired value sensed by the first pick-up agrees with the actual value sensed by the second pick-up so that the upsetting punch is always axactly in the correct position relative to the unit, as the template is moved relative to its feeler in dependence on the displacement of the unit. It will be understood that the template is designed in accordance with the desired upset profile and the described control operations will not be intermittently and sequentially performed but a continuous control is effected so that the speed of the upsetting punch is so much higher than the constant speed of the unit that the desired shell profile will be obtained.

As has been mentioned hereinbefore, the pressure roll in the unit must also be controlled so that the desired outside and/or inside diameter of the shell of the hollow body will be obtained. To this end, a feature of the invention resides in that the pressure roll is engageable with the hollow body by a piston-cylinder unit and has associated with it a template, which is also moved in unison with the displacement of the displaceable unit relative to a feeler, which acts on a pick-up, and another pick-up is provided, which is moved with the pressure roll, said two transducers are differentially connected to a common controller, which controls the application of pressure to the cylinder-piston unit for the pressure roll, and the pressure roll and the backing rolls are coupled to be engaged with the hollow body at the same radial distance from the axis of the hollow body. Thus, the control of the movement of the pressure roll to engage the hollow body is similar to the control of the displacement of the upsetting punch. The coupling between the pressure roll and the backing rolls may be effected by electrical or mechanical means and ensures that the hollow body is centered in the unit.

The invention is illustrated by way of example in the accompanying drawing, in which:

FIG. 1 is a vertical axial sectional view showing a tube-upsetting machine,

FIG. 2 is a transverse sectional view taken on line II—II of FIG. 1,

FIG. 3 is a side elevation showing the machine, and

FIG. 4 shows the same in a top plan view, partly cut open.

Two gripping heads 2, 3 are provided for a tubular workpiece 1. The gripping heads are connected by two tie rods 4 and two transverse yokes 5. A hollow gripping spindle 6 is rotatably mounted in the gripping head 2 and is driven by a motor 7 and a transmission 8. The gripping spindle 6 has two gripping jaws 9, which are adapted to be forced against the workpiece 1 by interposed wedges 10. The latter are adjusted with the aid of a hydraulic cylinder-piston unit 11. The workpiece 1 is thus held against axial displacement in the gripping head 2 and is rotated about its longitudinal axis.

The gripping head 3 consists substantially of an upsetting cylinder 12 and an upsetting piston 13, which is displaceable in the cylinder and to which hydraulic pressure can be applied. The piston rod 14 of the upsetting piston 13 is hollow. An upsetting punch 15 is rotatably mounted in the piston rod and engages the end face of the workpiece 1. Whereas the workpiece 1 is axially fixed and rotated in the gripping head 2, the gripping head 3 applies axial upsetting pressure to the workpiece 1 by means of the upsetting punch 15.

A unit 16 is displaceably mounted on the two tie rods 4. Each tie rod 4 carries a piston 17, which is disposed in a cylinder 18, which is firmly connected to the unit 16. FIGS. 1, 3 and 4 show the unit 16 in its initial position at the beginning of the shaping operations. If a pressure fluid is admitted into the interior of the cylinders 18 on the side facing the unit 16, the latter will be gradually displaced toward the gripping head 2 (FIG. 4). The unit 16 comprises an annular heating inductor 19, which partly surrounds the workpiece 1. The unit comprises also two lower backing rolls 20 and an upper pressure roll 21. The pressure roll 21 is forced against the workpiece 1, if desired, by means of a rocker 22, which is adjusted by a cylinder-piston unit 23. The backing rolls 20 are adjustable by means of cylinder-piston units 14. Electrical or mechanical coupling means, not shown, are provided for adjusting the pressure roll 21 and the backing rolls to the same radial distance from the axis of the workpiece. Such means for maintaining pressure and backing rolls at equal distances from an axis about which said rolls are spaced while said rolls are radially moved relative to said axis are known in the art and need not be described in detail. The pressure roll 21 is hollow and is mounted with ample radial clearance on a rod 25 so that it is forced against the workpiece only by means of the transfer rollers 26, which are mounted in the rocker 22, whereas the rod 25 serves only to prevent a dropping of the pressure roll.

During operation, a narrow annular zone of the workpiece is heated by the annular heating inductor 19 and the displacement of the unit causes said heated zone to advance along the workpiece. The latter is upset at the same time by means of the upsetting piston 13 and the upsetting punch 15.

The inductor power and the upsetting pressure are held constant throughout the shaping operation, whereas the displacement of the upsetting piston 13 is varied or controlled in dependence on the displacement of the annular heating inductor 19 or the unit 16 so that the desired shell profile is imparted to the workpiece 1. To this end, a template 28 is connected to the unit 16 by a rod 27 (FIGS. 2 and 3). A feeler 29 cooperates with the template 28 and is fixed to the gripping head 3. This feeler operates an electrical transducer 30, which consists of a synchro 30. Another transducer consisting of a synchro 31 is adjusted by a rack 32, which is displaced with the upsetting piston 23. The two synchros 30, 31 are differentially connected to a common controller 33 or an amplifier. The controller 33 or the amplifier acts on control valves 34, which control the admission of pressure fluid to the upsetting piston 13. The desired value sensed at the template is thus compared with the actual value, which is sensed by the pick-up 31, and the upsetting piston is displaced until the desired and actual values agree.

If only a radially outward displacement of the material is desired during the upsetting operation, a mandrel is screwed into the upsetting punch 15 and the pressure roll 21 is rendered inoperative. The outside diameter of the mandrel agrees with the inside diameter of the workpiece. If an upsetting is desired only on the inside so that material is to be displaced only inwardly, the pressure roll is held in the position which corresponds to the original outside diameter of the workpiece and a mandrel is not employed. For an upsetting both on the inside and on the outside, the pressure roll must be controlled in accordance with the desired external profile. For this purpose, an additional template 35 is provided, which is also displaceable with the aid of the rod 27 and which is combined with a feeler 36 and a pick-up 37 for the desired value. A pick-up 38 for the actual value is controlled by the cylinder-piston unit 23. The common controller 39 compares the desired and actual values and operates the valves 40, which control the admission of pressure fluid to the cylinder-piston unit 23.

What is claimed is:

1. A process of forming peripherally continuous enlarged portions on a shell of a cylindrical hollow body, which process comprises:

gripping a hollow body in its axial direction between a stationary gripping station and an upsetting punch, partly surrounding said hollow body with an annular heating inductor, rotating the gripped hollow body about its axis, applying a constant upsetting pressure through said punch to said rotating, gripped, hollow body, supplying constant electric power to said heating inductor and displacing the same at constant speed in the axial direction of said rotating, gripped hollow body while the same is under said upsetting pressure, whereby said hollow body is subjected to a local temperature rise in an axially advancing zone, and controlling the displacement of said upsetting punch in dependence on the position of said inductor so as to obtain the desired shell profile.

2. A process as set forth in claim 1, which comprises:

radially engaging a pressure roll with said hollow body adjacent to said inductor, and moving said pressure roll in unison with said inductor so that said pressure roll engages said hollow body adjacent to said advancing zone.

3. A process as set forth in claim 1, in which said inductor is moved in the same direction in which pressure is applied to said hollow body by said upsetting punch.

4. Apparatus for forming peripherally continuous, enlarged portions on a shell of a cylindrical hollow body, which apparatus comprises:

a first gripping head defining an axis of rotation and adapted to grip a hollow body at a point spaced in the direction of said axis from one end face of said hollow body so as to hold said hollow body against a movement along said axis and to permit of a rotation of said hollow body about said axis, a second gripping head which comprises an upsetting punch which is centered on and extensible toward said first gripping head in the direction of said axis to engage said one end face of a hollow body gripped by said first gripping head, a displaceable unit which is disposed between said gripping heads and displaceable along said axis, said displaceable unit comprising an annular heating inductor which is arranged to partly surround a hollow body which is held between said gripping heads, a template, a feeler which is arranged to move along said template in unison with the movement of said displaceable unit relative to said first gripping head, said template being arranged to control the excursions of said feeler, a first transducer for producing an output signal which indicates the excursion of said feeler, a second transducer for producing an output signal which indicates the position of said upsetting punch relative to said first gripping head, pressure-applying means operable to apply a constant upsetting pressure to said punch and to extend the same toward said second gripping head, and a controller having the outputs of said two transducers differentially coupled to it and adapted to control said pressure-applying means so that they extend said punch in response to a difference between said output signals.

5. Apparatus as set forth in claim 4, in which said displaceable unit comprises an upper pressure roll and two lower backing rolls and means for radially engaging said rolls with a hollow body held by said gripping heads.

6. Apparatus as set forth in claim 5, which comprises:

roll-setting means which are operable to radially engage said rolls with said hollow body at points which are spaced equal radial distances from said axis, said roll-setting means comprising a cylinder-piston unit and valve means controlling the application of fluid pressure to said cylinder-piston unit, said apparatus further comprising:

a second template, a second feeler, which is movable relative to said second template in unison with the movement of said displaceable unit relative to said second gripping head, said second template being arranged to control the excursions of said second feeler, a third transducer for producing an output signal which indicates the excursion of said second feeler, a fourth transducer for producing an output signal which indicates the radial distance of said pressure roll from said axis, and a second controller which has the outputs of said third and fourth transducers differentially connected to it and which is adapted to control said valve means in response to the difference between the output signals of said third and fourth transducers.

References Cited

UNITED STATES PATENTS

| | | | |
|---|---|---|---|
| 1,712,118 | 5/1929 | Powers | 72—69 |
| 3,071,992 | 1/1963 | Martin et al. | 72—7 |
| 3,198,928 | 8/1965 | Allison | 72—342 |

CHARLES W. LANHAM, Primary Examiner

L. A. LARSON, Assistant Examiner

U.S. Cl. X.R.

72—69, 342